United States Patent [19]

Kimmell et al.

[11] 4,377,441
[45] Mar. 22, 1983

[54] SOLAR HEATED ALCOHOL STILL

[75] Inventors: Steven D. Kimmell, Granada Hills, Calif.; Jack P. Murphy, deceased, late of Huntington Beach, Calif., by James P. Murphy, administrator

[73] Assignee: Mattel, Inc., Hawthorne, Calif.

[21] Appl. No.: 405,049

[22] Filed: Aug. 4, 1982

Related U.S. Application Data

[63] Continuation of Ser. No. 244,415, Mar. 16, 1981, abandoned.

[51] Int. Cl.³ .......................... B01D 3/16; B01D 3/42
[52] U.S. Cl. ...................................... 202/153; 202/158; 202/160; 202/181; 202/234; 202/238; 202/267 R; 137/468; 203/1; 203/2; 203/DIG. 1; 203/DIG. 13; 236/59; 236/101 D; 251/11
[58] Field of Search .................. 203/DIG. 1, 1, 2, 86, 203/DIG. 13, 19; 202/160, 153, 158, 181, 234, 267, 238; 126/901; 236/96 R, 59, 101 D; 73/363.7, 363.5; 137/468

[56] References Cited

U.S. PATENT DOCUMENTS

| Re. 16,940 | 4/1928 | Massa | 73/363.7 |
|---|---|---|---|
| 68,080 | 8/1867 | Hutchinson | 137/468 |
| 102,633 | 5/1870 | Wheeler et al. | 203/DIG. 13 |
| 1,583,136 | 5/1926 | Srulowitz et al. | 236/59 |
| 1,730,892 | 10/1929 | Leslie | 203/1 |
| 1,872,958 | 8/1932 | Johnson | 203/2 |
| 2,141,330 | 12/1938 | Abbot | 203/DIG. 1 |
| 2,277,070 | 3/1942 | Carney | 202/160 |
| 2,300,299 | 10/1942 | Lund | 73/363.7 |
| 2,329,968 | 9/1943 | Wingert | 73/363.7 |
| 2,352,203 | 6/1944 | Johnson | 73/363.7 |
| 2,364,341 | 12/1944 | Bright et al. | 203/2 |
| 2,460,482 | 2/1949 | Abbot | 203/DIG. 1 |
| 2,467,174 | 4/1949 | Wilson | 202/160 |
| 2,476,280 | 7/1949 | Bragg et al. | 202/160 |
| 3,447,748 | 6/1969 | Saronni | 236/59 |
| 4,118,283 | 10/1978 | Diggs | 202/160 |
| 4,245,783 | 1/1981 | Richter | 236/59 |
| 4,267,218 | 5/1981 | Brügger | 126/901 |
| 4,276,122 | 6/1981 | Snyder | 203/DIG. 1 |
| 4,306,940 | 12/1981 | Zenty | 203/DIG. 1 |
| 4,326,923 | 4/1982 | Mortenson | 203/DIG. 1 |

Primary Examiner—Wilbur L. Bascomb, Jr.
Attorney, Agent, or Firm—Reagin & King

[57] ABSTRACT

An alcohol still having a boiler with a valve for maintaining the amount of liquor constant. The boiler mounts a distilling column having a temperature controlled inlet for liquor to be distilled which assists in maintaining the operation at a constant optimum operating temperature.

4 Claims, 4 Drawing Figures

SOLAR HEATED ALCOHOL STILL

This application is a continuation, of application Ser. No. 244,415, filed 3/16/81 now abandoned.

BACKGROUND OF THE INVENTION

This invention relates to distilling apparatus, and more particularly, to high efficiency alcohol stills.

The rise in the cost of energy, especially that of the petroleum products used to power internal combustion engines, has given impetus to research directed toward more efficient use of those energy sources available. An accepted method of conserving oil is to add ethyl alcohol (ethanol) to the gasoline used in internal combustion engines or to use alcohol alone to power such engines.

Ethanol is obtained by distilling the liquor produced by an alcoholic mash. The normal distilling process uses a substantial amount of energy to heat the mash, and it is quite desirable to enhance the efficiency of the process and thereby reduce the energy utilized in manufacturing the alcohol. Moreover, the enhancement of the efficiency of the distilling process is especially important where the energy to be utilized for heating is solar energy because the direct utilization of solar energy provides but a limited amount of heat for the distilling process.

It is therefore an object of this invention to provide a more efficient distilling process.

It is another object of this invention to provide a self-controlled arrangement for distilling alcohol which maintains the volume of liquid to be distilled, the temperature of the process, and the other variables of the process as close to optimum constants as possible.

SUMMARY OF THE INVENTION

The foregoing and other objects of the invention are accomplished by a distilling arrangement which has a boiler of a generally spherical shape adapted to be positioned at the focal point of a parabolic reflector which concentrates the sun's rays. The boiler is connected to a distilling column having means for monitoring the temperature in the column and for adjusting the amount of liquor added to the boiler in accordance with the temperature. The boiler also contains means for automatically adjusting the amount of fluid which it contains so that the amount and temperature of the liquor does not vary substantially and the distillation process may be maintained at its optimum point.

Other objects, features, and advantages of the invention will become apparent by reference to the specification taken in conjunction with the drawings in which like elements are referred to by like reference designations throughout the several views.

BRIEF DESCRIPTION OF THE DRAWINGS

FIG. 4 is a cross-sectional side view of a detail of the arrangement shown in FIG. 2.

DESCRIPTION OF THE PREFERRED EMBODIMENT

Figure 1:
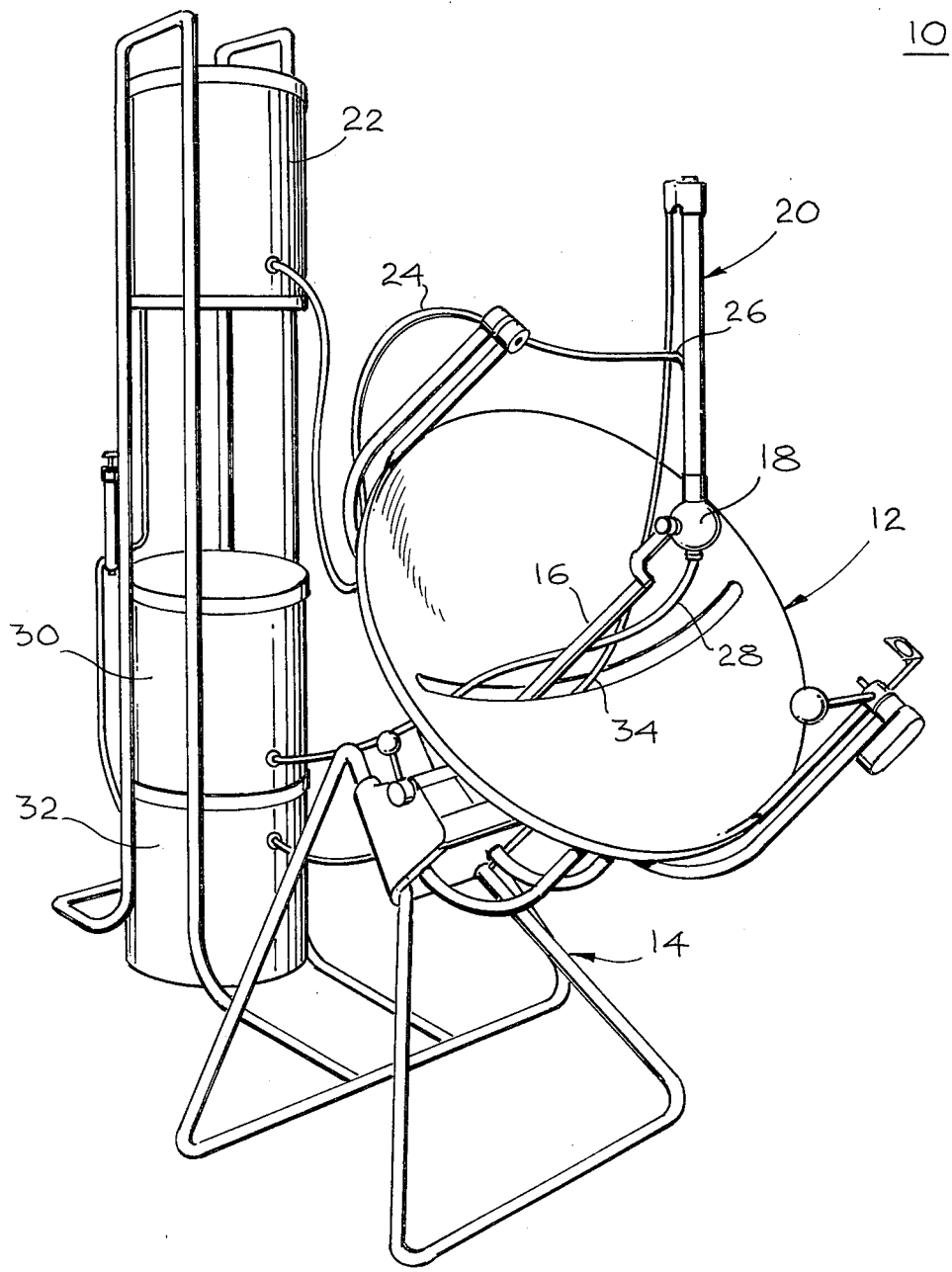
FIG. 1 is a perspective view of a distilling system constructed in accordance with the present invention.

Referring now to the drawings and, more particularly, to FIG. 1, there is shown a perspective view of a solar distilling system 10 constructed in accordance with this invention. The system 10 includes a parabolic reflector 12 positioned by a mounting system 14 which provides means for adjusting the focus of the reflector 12. The mounting system 14 supports a member 16 which mounts a boiler 18. The boiler 18 has projecting therefrom in a vertical direction a distilling column 20. A liquor tank 22 provides an alcoholic liquor to be distilled which is carried to an inlet 26 in the distilling column 20 by a tube 24. An exit tube 28 leads from the bottom of the boiler 18 to a collection tank 30 which gathers the overflow of liquor used in the distilling process. A distillate tank 32 is connected by a tube 34 to the upper portion of the distilling column 20.

Figure 2:
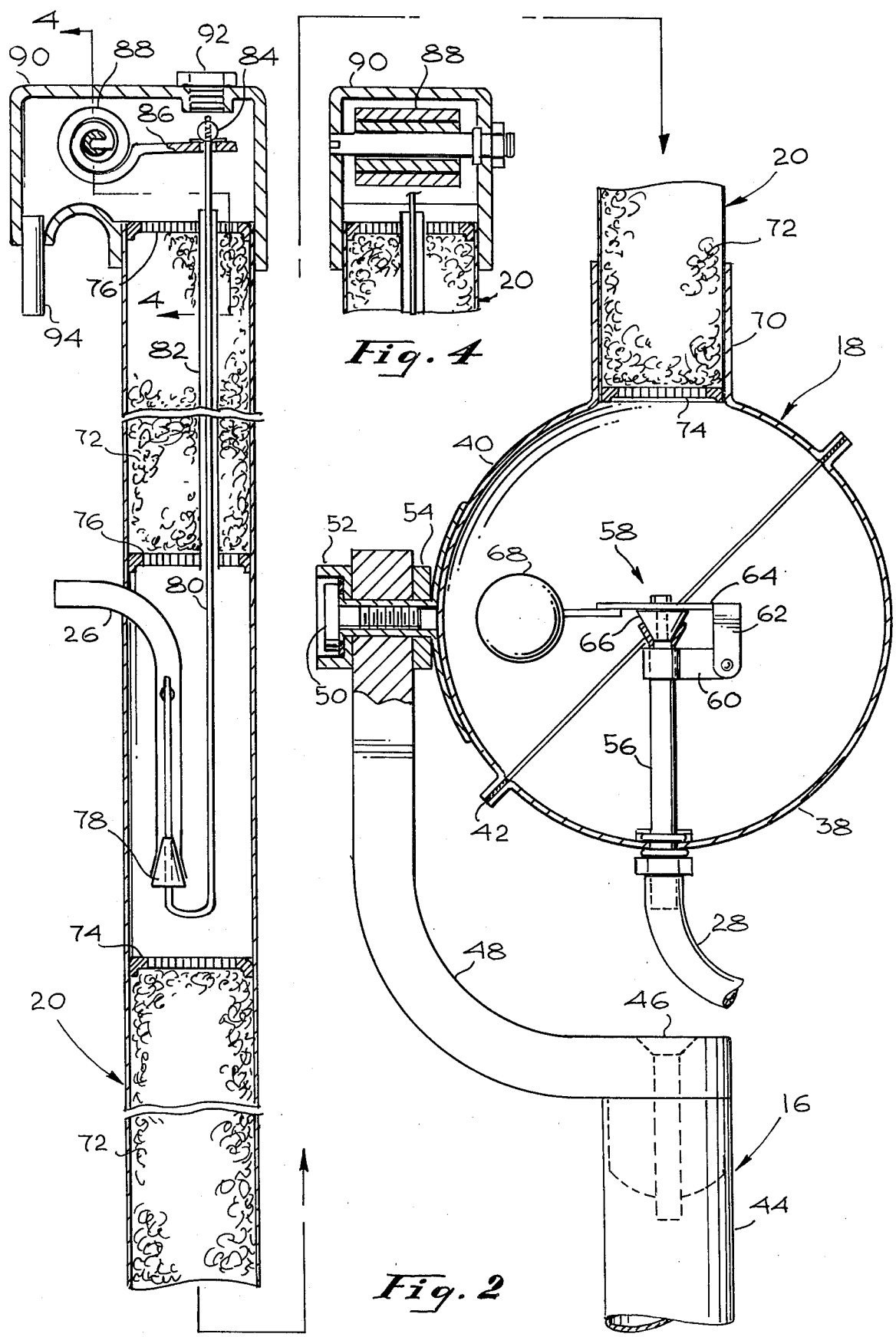
FIG. 2 is a front cross-sectional view of the boiler and distilling column of the distilling system shown in FIG. 1.
Figure 3:
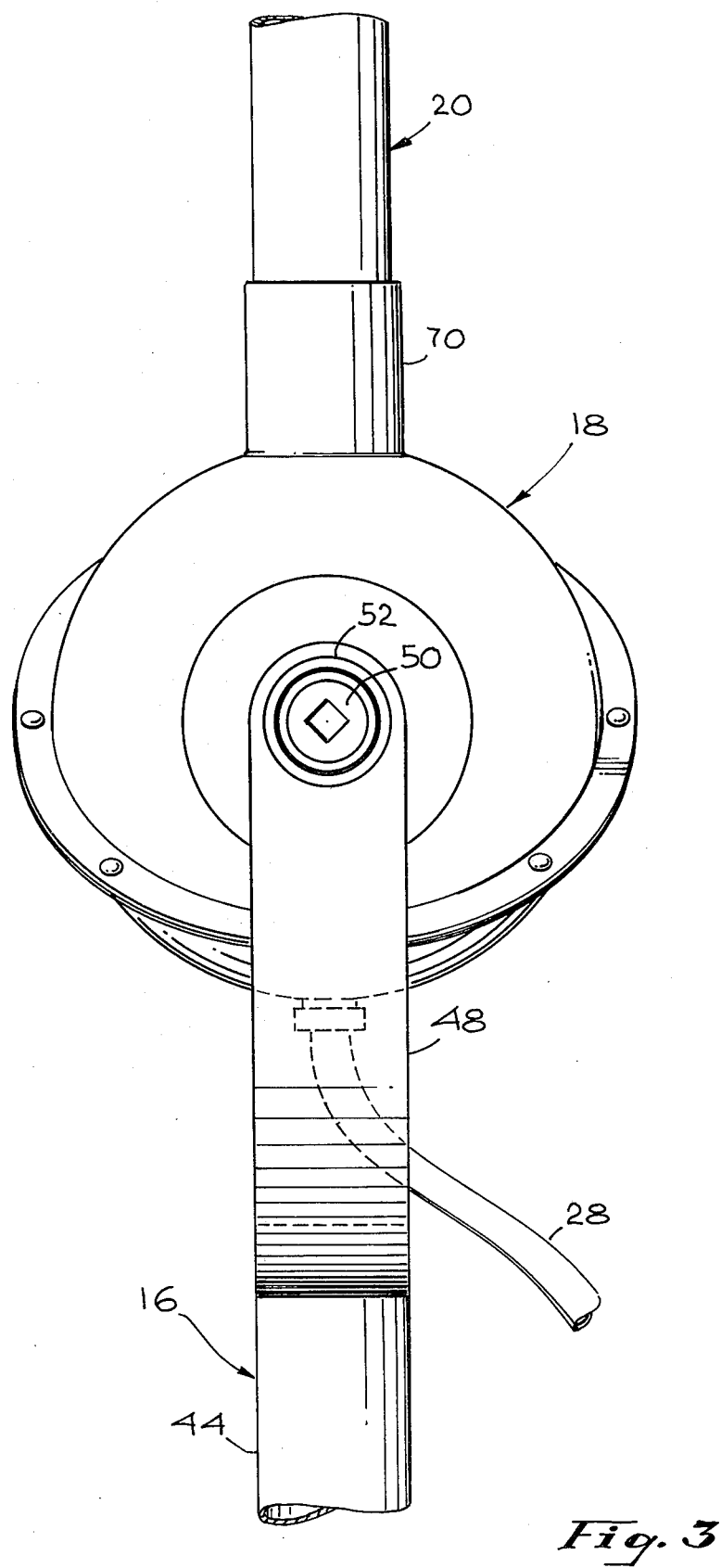
FIG. 3 is a partial side view of the arrangement shown in FIG. 2.

Referring now to FIG. 2, there is shown a cross-section of the boiler 18 and the distilling column 20 which together constitute the main distilling apparatus of the system 10. As may be seen in FIG. 2, the boiler 18 is a relatively thin sphere made of two halves 38 and 40 joined together along a plane. The junction may be made by screws or by other sealing means well known to the art. In the arrangement shown in FIG. 2, a gasket 42 is provided between the two halves 38 and 40 for assuring the tightness of the seal between the halves 38 and 40.

In the preferred embodiment, the boiler 18 is constructed of aluminum anodized black on its exterior. The black anodizing enhances the utilization of energy projected on the boiler 18 by the parabolic reflector 12. The member 16 includes a lower portion 44 which is connected at a pivot 46 to an upper portion 48. The upper portion 48 is pivoted to the exterior of the boiler 18 by an adjustable screw 50 which projects through the member 48 and tightens in a recess in the end of a washer 52. The screw 50 also fits through a washer 54 between the member 48 and the boiler 18. The washers 52 and 54 are constructed of a material selected to provide thermal isolation between the member 48 and the boiler 18.

The adjustment of the pivot 46 and the screw 50 allow the boiler 18 to be moved so that its column 20 remains vertical even though the position of the reflector 12 may change.

A tube 56 which may be constructed of stainless steel is held in place in an aperture at the bottom of the boiler 18 and mounts a valving arrangement 58 which is adapted to maintain the level of liquor in the boiler 18 constant once it reaches that particular level. The tube 56 connects to the tube 28 which removes liquid which overflows from the boiler 18.

The arrangement 58 is mounted upon an arm 60 which clamps about, is held in place by, and projects from the tube 56. Pivoted from the arm 60 is a second arm 62 which mounts a plate 64 at right angles thereto. The plate 64 carries on its bottom surface a valve 66 which may be constructed of a material such as Teflon which is impervious to the temperatures and chemicals of the distillation process. The plate 64 also mounts a float 68 which moves with the liquor in the boiler 18 to open and close the valve 66 so that liquor in the boiler 18 above the top of the tube 56 exits through the tube 56 and the tube 28. Each of the arms 60 and 62, the plate 64, and the float 68 may be constructed of stainless steel.

Extending upwardly from the boiler 18 is a cylindrical exit portion 70 which may, in the preferred embodiment, be an extension of the boiler 18 and may be constructed of black anodized aluminum. The exit portion 70 carries therein a cylindrical distilling column 20 which may in the preferred embodiment be constructed of stainless steel. The column 20 projects upwardly over a distance of approximately eighteen inches in the preferred embodiment and has packing material 72 arranged so that vapors of distillation may pass therethrough. The packing material 72 is held in place between a first pair of screens 74 which are arranged to provide an interference fit with the interior of the column 20 and between a second pair of screens 76 arranged to provide the same sort of interference fit with the interior of the column 20. The packing material 72 may in the preferred embodiment be constructed of stainless steel and is adapted to provide a substantial surface within the interior of the column 20 for the condensation of water and other less volatile liquids than alcohol.

The inlet 26 is mounted by and projects into the interior of the column 20 at about the middle thereof. The inlet 26 is connected to the tube 24 which leads to the tank 22 containing the alcoholic liquor to be distilled. The end of the inlet 26 is closed by a valve 78 which may be constructed, in the preferred embodiment, of Teflon or some other material essentially impervious to the distillation process. The valve 78 is connected to a rod 80 which turns and projects upwardly through a stainless steel tube 82 and exits therefrom at the extreme upper end of the column 20. The rod 80 is connected by adjusting nut 84 to an arm 86 extending from a bimetallic spring 88. The spring 88 is mounted to the side of an exit cap 90 and is adapted to provide movement at approximately 173° F., the temperature selected for the optimum peak temperature at the top of column 20 for the distillation of alcohol.

A particular bimetallic spring 88 has been constructed of steel and aluminum which provides approximately one sixteenth of an inch of downward movement of the adjusting nut 84 when the temperature reaches 173° F. Another spring 88 utilizing a first alloy of 22% nickel, 3% chromium, and 75% iron and a second alloy of 36% nickel and 64% iron may also be utilized. The movement of approximately one sixteenth of an inch at the adjusting nut 84 in a downward direction is conveyed to move the valve 78 downwardly, opening the lower end of the tube 26 and allowing liquor from the tank 22 to enter the column 20. The entrance of liquor immediately coats the lower portion of the filler 72 raising the temperature of the newly added liquor and lowering the temperature of the column thereby causing the bimetallic spring 88 to close the valve 78 and limit the amount of liquor added to the column 20. This liquor flows downwardly and drips from the packing material 72 into the boiler 18 where it maintains the level of fluid once the process has reached the optimum operational point just below the level at which the float 68 opens the tube 56 to provide an exit for liquor from the boiler 18.

The arrangement of the temperature controlled inlet 78 and the volume controlled outlet valve 66 provide that once the distilling process has begun it will continue at approximately the optimum point for distillation of alcohol without large temperature or volume swings caused by the entry of new liquor through the inlet 26 or the exit of liquor through the tube 56. In order to enhance the process, an access plug 92 which may be constructed of aluminum is positioned above the adjusting nut 84 to allow the adjusting nut 84 to be moved so that the temperature may be varied about the preferred point to obtain better distillation. In the preferred embodiment, the exit cap 90 is constructed of aluminum and carries a short stainless steel tube 94 which is connected to the exit tube 34.

In operation, liquor from the tank 22 is fed through the tube 24 and enters the column 20 dripping down through the packing 72 into the boiler 18. Initially, the amount of liquor provided should be just less than sufficient to half fill boiler 18. The reflector 12 is then focused so that the rays of the sun are directed to a precise focal point at the center of the sphere which constitutes the boiler 18. It is conceivable that other forms of energy might be used to heat the boiler 18 and, consequently, the arrangement of this invention should be considered as useful with other forms of heating devices. As the valve 78 is normally closed when the temperature of the column is under the selected optimum temperature, this valve must be opened manually to start the operation or, alternatively, the boiler must be preheated before the entrance of liquor through the inlet tube 26 so that when the optimum temperature is reached the bimetal spring 88 will operate the arm 86 to move the rod 80 and open the valve 78.

In either case, the liquor which enters the boiler 18 will be heated by the rays of the sun or other heat source and the various elements of the liquor will be released in gaseous form. As is well known, ethanol being more volatile than water will vaporize at a lower temperature and proceed up to the column 20 through the packing 72 and exit through the tube 94 and the tube 37 to be deposited into tank 32. Water and less volatile liquids will also escape as gases and proceed into the column 20 and through the packing 72. However, the length of the column 20 and the surface provided by the packing 72 are such that there will be a substantial temperature differential between the boiler 18 and the upper end of the column 20. The dimensions of the column 20 and the specifications of the bimetal spring 88 are adapted to provide that the top of column 20 will just reach 173° F. after an appreciable amount of liquor in the boiler 18 has changed to the gaseous state. Consequently, the valve 78 opening the inlet tube 26 will remain closed until the liquor level in the boiler 18 is lowered somewhat and will then open to allow a small additional amount of liquor into the boiler 18. By adjusting the nut 84, the opening of the valve 78 and the dissipation of liquid from the boiler 18 may be adjusted to take place in such a manner that the system remains almost at its optimum point once the distillation process has begun.

The difference in temperature in the column 20 will cause the water vapors and other less volatile gaseous state materials to collect as liquid on the packing 72 and drip downwardly into the boiler 18. As the level of liquor in the boiler 18 reaches the top of the tube 56, the valve 66 will be opened by the upward movement of the float 68. This will cause excess liquor to overflow through the tube 56 and be carried by the tube 28 to the tank 30 where it may be recirculated through the tank 22 and into the boiler 18.

While there has been shown and described a preferred embodiment, it is to be understood that other various adaptations and modifications may be made which will fall within the spirit and scope of the invention.

What is claimed is:

1. A solar heated still comprising a mounting platform; a parabolic reflector pivotally mounted to the platform; a boiler adjustably mounted to the platform by a member extending from the platform through a slot in the reflector to the boiler, whereby the boiler is positioned adjacent the focal point of the reflector; means positioned between the boiler and the member for thermally isolating the boiler from the member; a distilling column mounted atop the boiler and having an open bottom end which directly communicates with the boiler; means for adjusting the position of the boiler so that the distilling column extends vertically above the boiler; an inlet tube having one end mounted within the distilling column for furnishing liquor to the boiler; means within the boiler for controlling the maximum amount of liquor in the boiler including an outlet from the bottom of the boiler, a first valve mounted within the boiler for closing the outlet, a float within the boiler, and means within the boiler responsive to movement of the float for opening and closing the first valve; a second valve mounted within the distilling column and connected to regulate the flow of liquor through the one end of the inlet tube, a temperature sensitive bimetallic spring mounted within the distilling column for detecting the temperature therein; linkage means mounted within the column for coupling the mechanical motion of the spring to the second valve, whereby an increase in the temperature detected by the spring causes the second valve to move in a direction to permit an increase in the flow of liquor through the inlet tube; and means for positioning the reflector to focus the rays of the sun on the boiler.

2. The still as in claim 1 in which the bimetallic spring is mounted adjacent the top of the distilling column.

3. The still as in claim 1 in which the linkage means includes a rod fastened between the second valve and the spring.

4. The still as in claim 3 in which the rod is adjustably fastened to the spring to enable the variation of the amount of flow of the liquor through the inlet tube as a function of the temperature detected by the spring.

* * * * *